Aug. 21, 1923.
C. RODGERS
AUTOMOBILE FENDER
Filed March 29, 1923    6 Sheets-Sheet 1
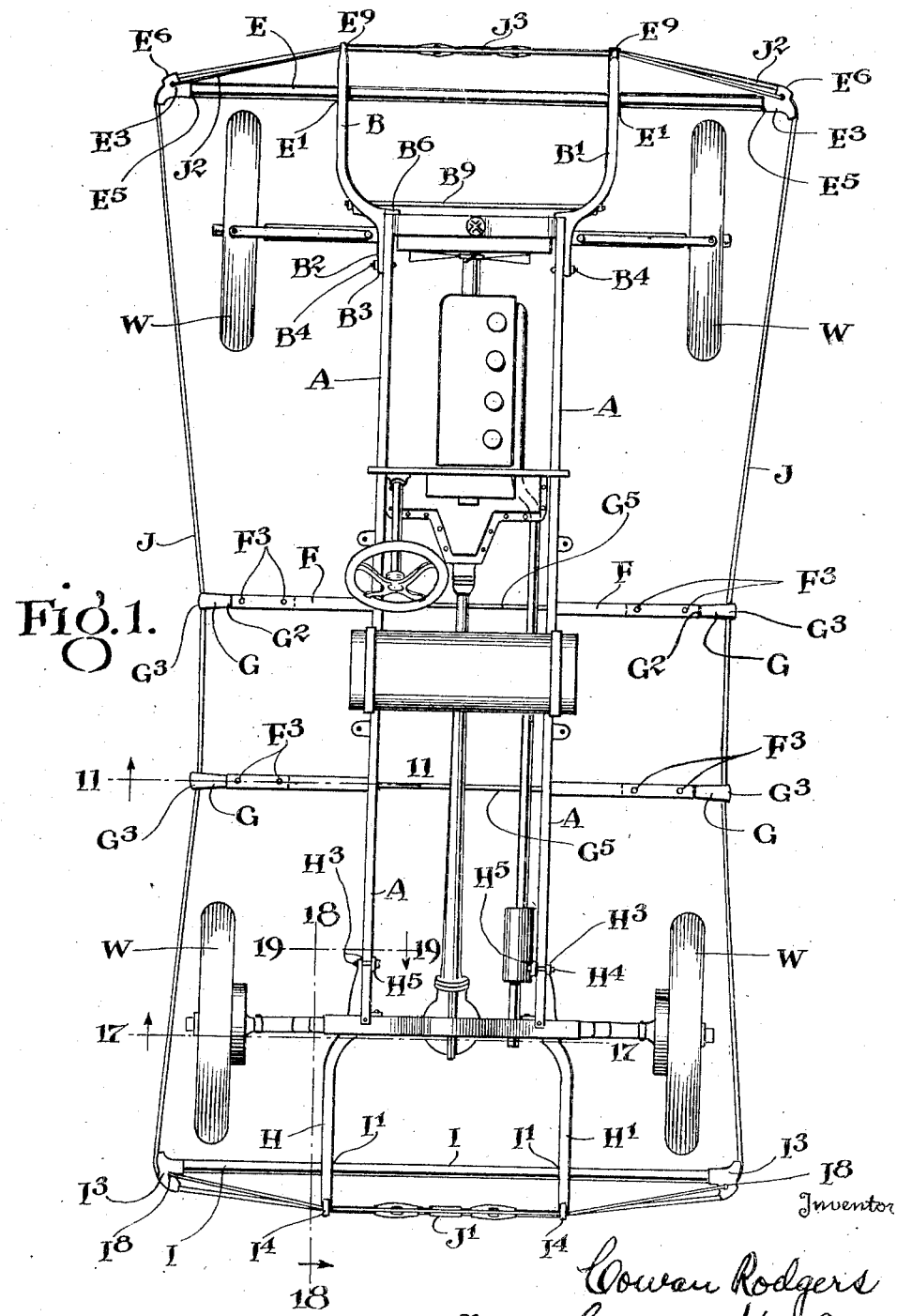

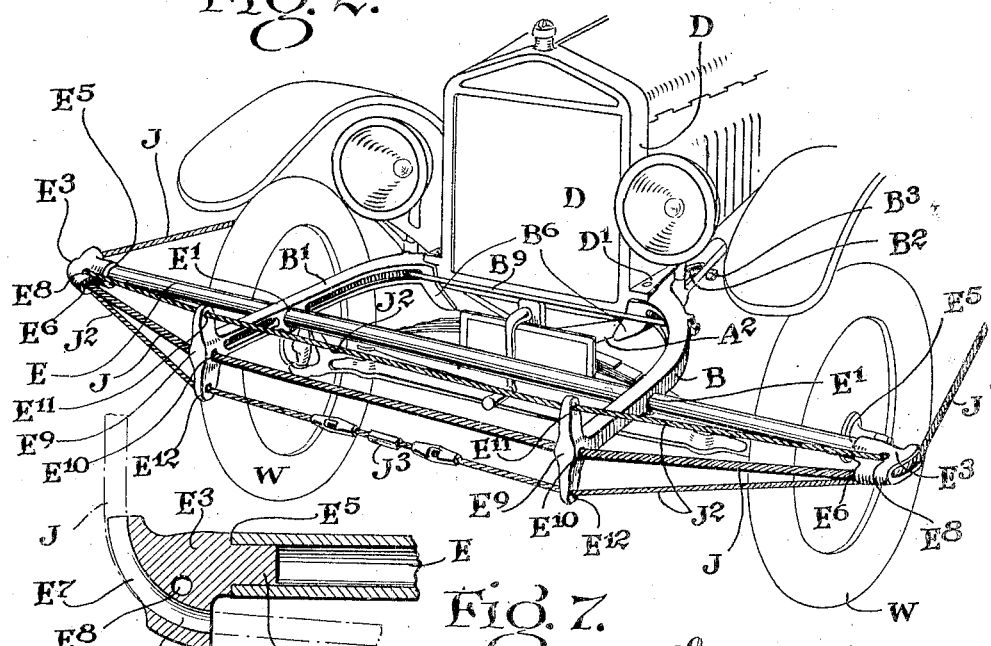
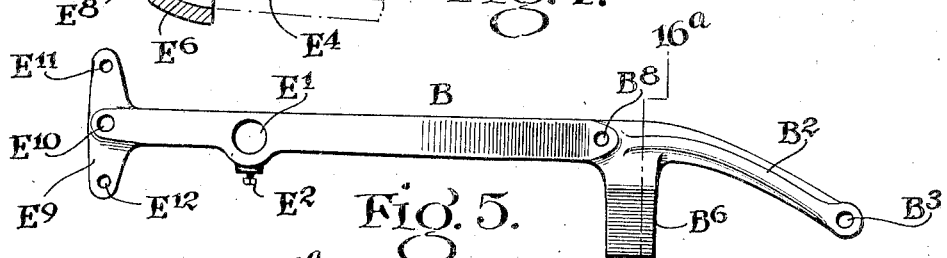
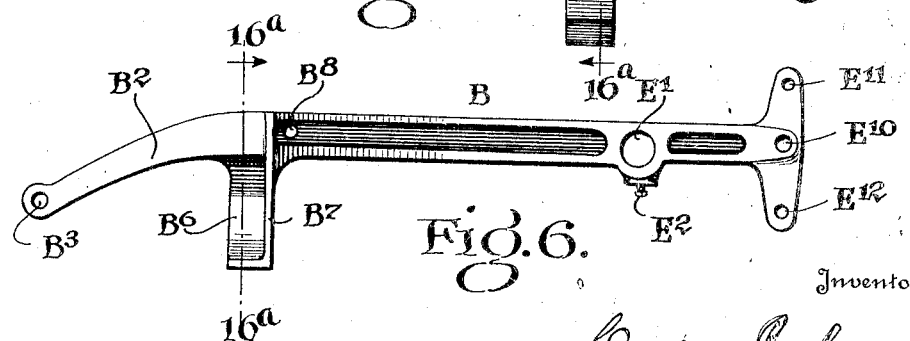

Aug. 21, 1923.
C. RODGERS
1,465,590
AUTOMOBILE FENDER
Filed March 29, 1923   6 Sheets-Sheet 3
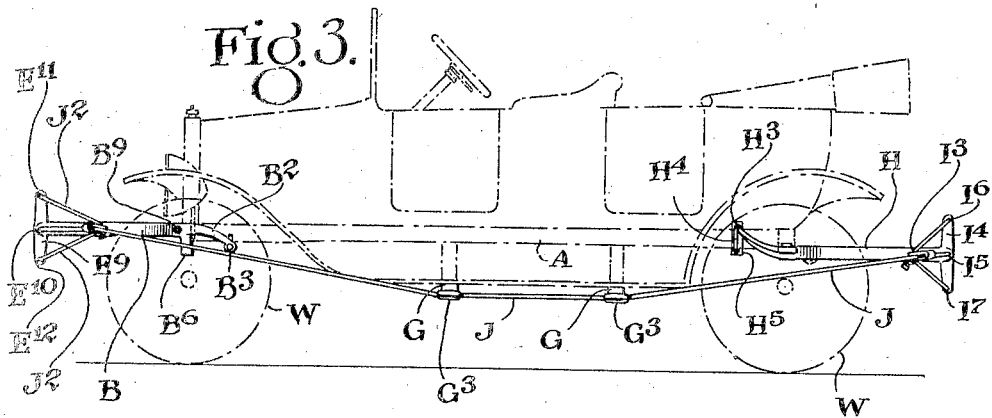
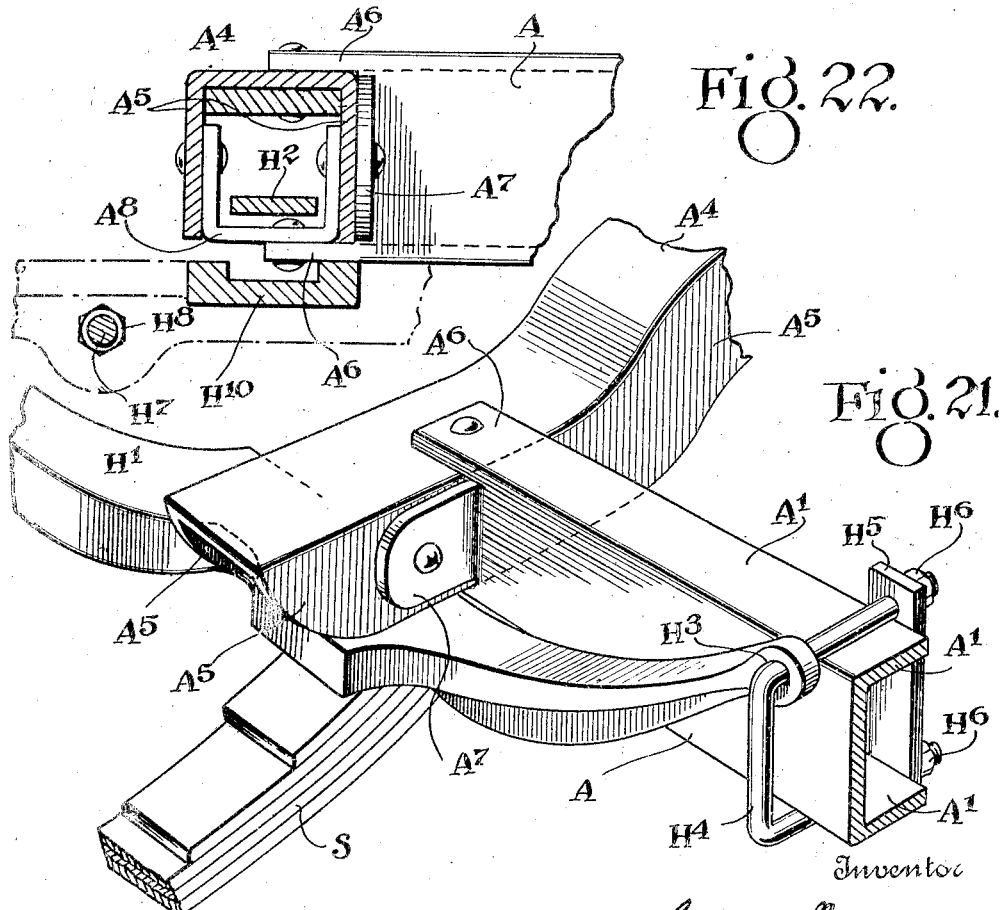
Inventor
Cowan Rodgers
By Cyrus Kehler
Attorney

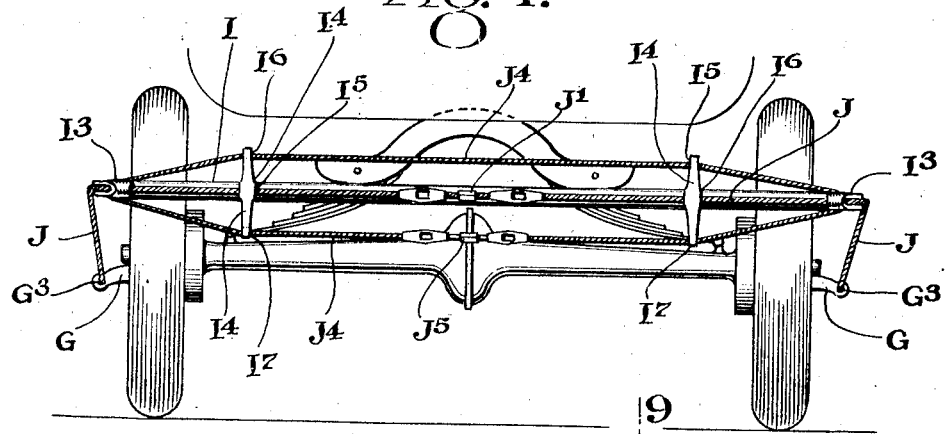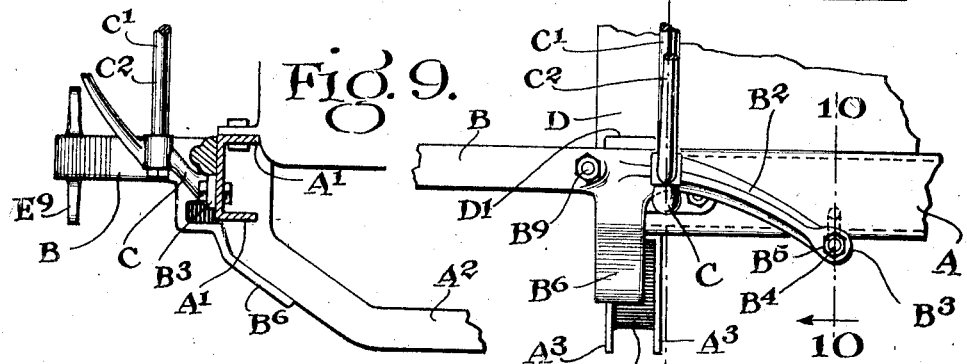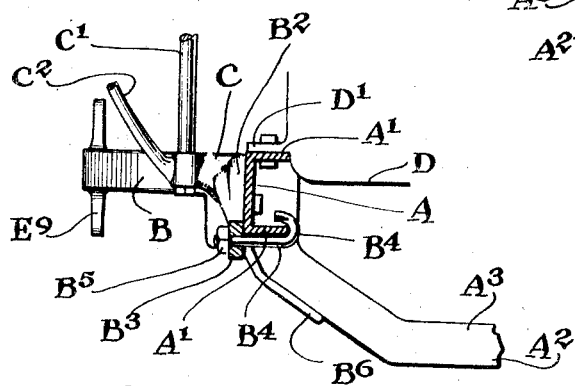

Aug. 21, 1923.
C. RODGERS
1,465,590
AUTOMOBILE FENDER
Filed March 29, 1923      6 Sheets-Sheet 5
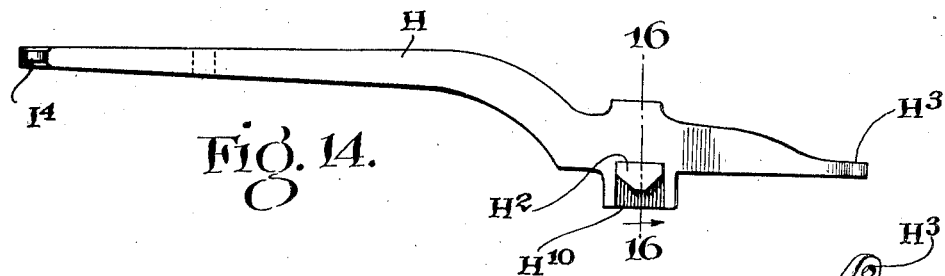
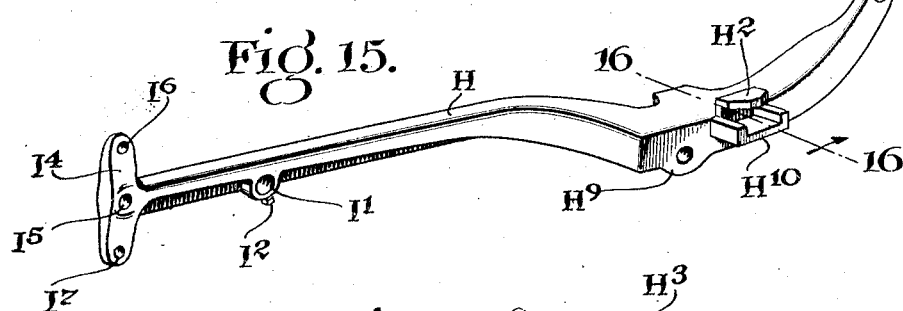
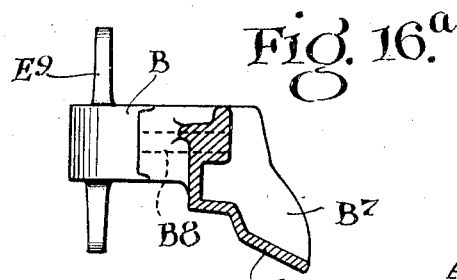
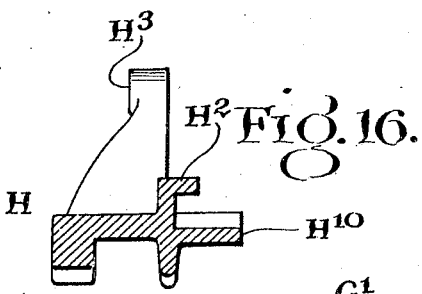
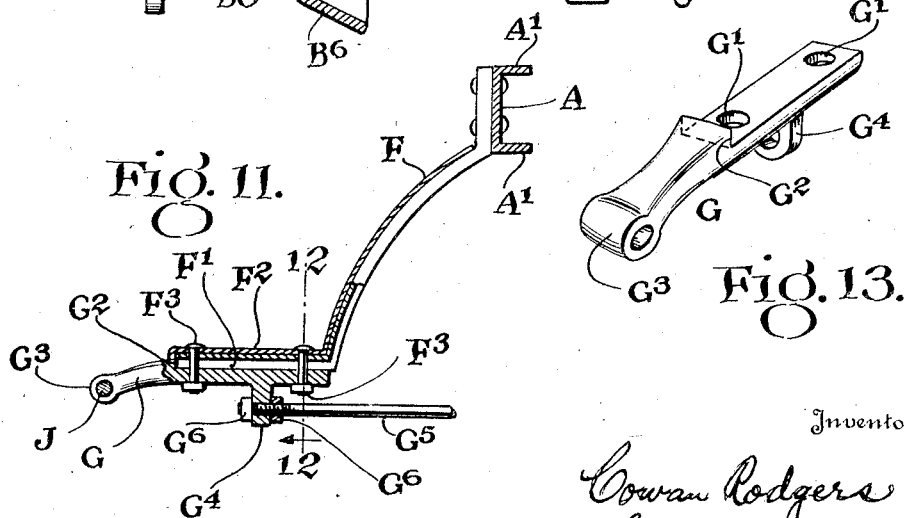

Aug. 21, 1923.
C. RODGERS
AUTOMOBILE FENDER
Filed March 29, 1923     6 Sheets-Sheet 6
1,465,590
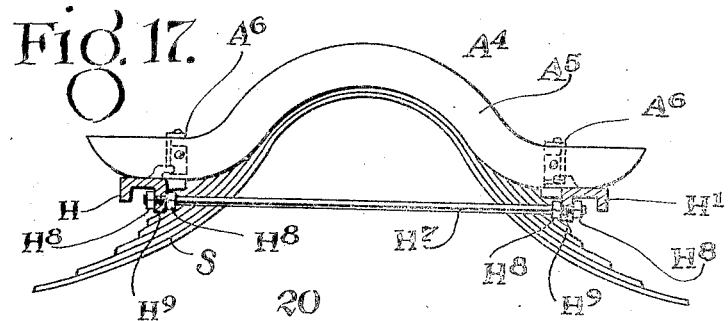
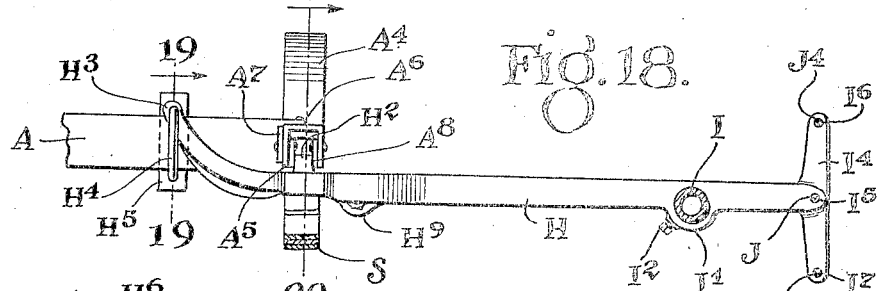
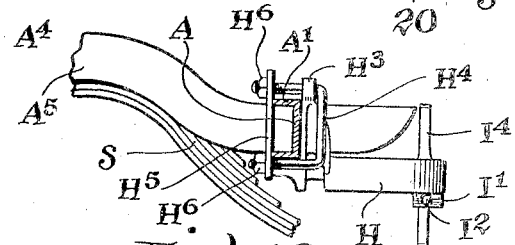
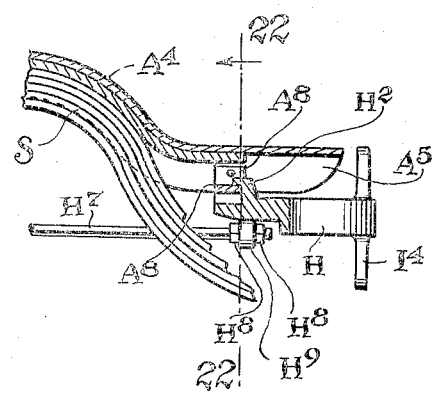
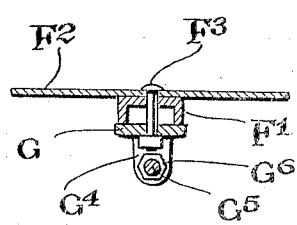
Inventor
Cowan Rodgers
By Cyrus Kehr
Attorney

Patented Aug. 21, 1923.

1,465,590

UNITED STATES PATENT OFFICE.

COWAN RODGERS, OF KNOXVILLE, TENNESSEE.

AUTOMOBILE FENDER.

Application filed March 29, 1923. Serial No. 628,511.

*To all whom it may concern:*

Be it known that I, COWAN RODGERS, a citizen of the United States, residing at Knoxville, in the county of Knox and State of Tennessee, have invented a new and useful Improvement in Automobile Fenders, of which the following is a specification, reference being had to the accompanying drawing.

This improvement relates to a fender structure for automobiles which is to serve to protect the automobile when in collision with another automobile or any other body and also to protect the other automobile or body.

The object of the invention is to provide such a fender structure in a form adapted to serve, at the ends and also at the sides of the automobile, in such manner as to reduce shock and avoid interlocking of the fendered automobile with the other automobile or other body with which there is collision. A further object of the invention is to provide such a structure which is well adapted to serve as a fender and also serve as a means of imparting stability to the automobile frame. A further object of the invention is to provide such a structure in economical form and in a form to the least extent cumbersome or unsightly.

In the accompanying drawings,

Fig. 1 is a plan of a Ford automobile, from which the body has been removed and to which my fender structure is applied;

Fig. 2 is a perspective of the front end of the same automobile, the body having been replaced;

Fig. 3 is an elevation of the left hand side of the same automobile;

Fig. 4 is a rear view of the same automobile;

Fig. 5 is a side elevation of the left hand supporting arm forming a part of the fender structure at the front of the automobile, as shown in Figs. 1 and 2;

Fig. 6 is an elevation of the opposite side of the arm shown by Fig. 5;

Fig. 7 is a horizontal section through the right hand corner casting at the front end of the automobile, as shown in Figs. 1 and 2;

Fig. 8 is an elevation looking toward the right in Fig. 1 and showing the attachment of the left hand supporting arm to the front part of the automobile frame;

Fig. 9 is an upright, transverse section on the line, 9—9, of Fig. 8, looking toward the left;

Fig. 10 is an upright, transverse section on the line, 10—10, of Fig. 8, looking toward the left;

Fig. 11 is an upright, transverse section on the line, 11—11, of Fig. 1, looking in the direction of the arrow;

Fig. 12 is an upright section on the line, 12—12, of Fig. 11, looking toward the left;

Fig. 13 is a perspective of a cable-supporting bracket shown in Figs. 11 and 12;

Fig. 14 is a plan of the left hand supporting arm located at the rear of the automobile;

Fig. 15 is a perspective view looking toward the right hand or inner side of the left hand supporting arm which is located at the rear of the automobile;

Fig. 16 is a transverse section on the line, 16—16, of Figs. 14 and 15, looking toward the left;

Fig. 16$^a$ is a transverse section on the line, 16$^a$—16$^a$, of Figs. 5 and 6, looking in the directions of the arrows;

Fig. 17 is an upright, transverse section immediately at the rear of the rear cross member of the automobile frame, approximately on the line, 17—17, of Fig. 1;

Fig. 18 is a longitudinal section on the line, 18—18, of Fig. 1, looking toward the right, parts being omitted;

Fig. 19 is an upright transverse section on the line, 19—19, of Figs. 1 and 18, looking in the direction of the arrows;

Fig. 20 is an upright transverse section on the line, 20—20, of Fig. 18, looking toward the right;

Fig. 21 is a perspective showing the right hand arm of the fender structure at the junction of the right hand frame side member and the rear cross member of the frame, the view being from the left of the frame and downward and rearward;

Fig. 22 is an upright, longitudinal section on the line, 22—22, of Fig. 20, looking toward the right.

Referring to said drawings, A A are the usual horizontal, metal side members of the frame of the well-known Ford automobile. Said side members are of channel-form, the flanges, A$^1$, of each member being directed inward toward the opposite of said members. The front ends of said members are joined to each other by the transverse or cross end member, $A^2$. Said member is of channel-form and has its flanges, $A^3$, directed downward. A metal supporting arm, B, is attached to the forward end of the left hand frame side member, A. A metal supporting arm, $B^1$, is attached to the forward end of the right hand frame member, A. The arms, B and $B^1$, are directed forward and are duplicates, excepting that they are reversed in shape so that one is a left and the other is a right. Forward of the member, A, the member, B, is bent toward the left and then forward; and forward of the right hand side member, A, the member, $B^1$, is bent toward the right and then forward, whereby the space between the forward parts of the arms, B and $B^1$, is made wider than the distance between the frame members, A A.

The rear part, $B^2$, of the arm, B, is curved downward and terminates in a horizontal eye, $B^3$. The part, $B^2$, of the arm, B, lies against the outer face of the left hand frame member, A, passing above and resting on the bracket, C, by which the head light standard, $C^1$, and the front wheel guard support, $C^2$, are supported. The rear end of said part, $B^2$, is now low enough to receive a hook bolt, $B^4$, which has its body resting against the lower face of the adjacent side member, A, and has its hook engaging the lower flange, $A^1$, of said side member, while the nut, $B^5$, of said bolt bears against the outer face of the part, $B^2$, of said arm. (Figs. 8 and 10.) Said arm, B, has a branch, $B^6$, which extends obliquely downward from the body of the arm, B, and bears against the adjacent part of the lower face of the cross member, $A^2$, of the frame. A flange, $B^7$, is formed on said branch to extend along and against the front of the cross member, $A^2$. As above stated, the arm, $B^1$, is like the arm, B, excepting that it is reversed in shape. The arm, $B^1$, is similarly applied to the outer or right hand face of the right hand frame member, A, and to the right hand part of the cross member, $A^2$. By means of the hook bolts, $B^4$, the rear ends of the arms, B and $B^1$, are bound to the adjacent frame side members, A A, and the flanges, $B^7$, hold the arms, $B^1$, against rearward movement on the frame. In each arm, at the front of its flange, $B^7$, is a horizontal, transverse aperture, $B^8$. A horizontal tie rod, $B^9$, extends through said apertures and draws the part of the arms, B and $B^1$, rearward of said rod firmly against the side faces of the frame members, A A, and against the lower faces of the cross member $A^2$.

At each side of the radiator frame, D, is a horizontal flange, $D^1$, projecting across and upon the adjacent part of the upper face of the adjacent supporting arm. By means of these flanges and the hook bolts, $B^4$, these arms are held against upward movement.

By the means described, these supporting arms are held with ample force; and this is accomplished without cutting or boring the adjacent parts of the automobile, the supporting arms and the hook bolts being so shaped and placed as to make the necessary engagement with the parts of the Ford automobile as now on the market.

Near its forward end, each of the arms, B and $B^1$, has a horizontal, transverse bearing, $E^1$, in which rests a horizontal, cylindrical tubular metal bar, E. Set screws, $E^2$, extend into the bearings, $E^1$, for binding the bar, E, immovably to said arms. Said bar is long enough to bring its ends farther from the upright, middle, longitudinal plane of the automobile than are the front steering wheels, W, W, allowance being made for turning the wheels sidewise for steering.

One each outer end of the bar, E, is a corner piece, $E^3$, which has a neck, $E^4$, (Fig. 7) extending into the adjacent end of the bar, E, and having an annular shoulder, $E^5$, bearing against the adjacent end of said bar. At the front of the member, $E^3$, is a passage, $E^6$, formed in a horizontal plane. Said passage is curved and is of cylindrical cross section, the curve being on an upright axis located rearward of said passage. A channel, $E^7$, is a continuation of said passage, $E^6$, on the same curve. At the rear of the passage, $E^6$, the member, $E^3$, has an upright aperture, $E^8$. The members, $E^3$, are alike, excepting that one is reversed in shape relative to the other, whereby one is made a right and the other a left.

On the forward end of each arm, B and $B^1$, is an upright cross head, $E^9$, in the middle of which is a horizontal, transverse, aperture or eye, $E^{10}$, and in the upper end of which is a horizontal, transverse aperture or eye, $E^{11}$, and in the lower end of which is a horizontal, transverse aperture or eye, $E^{12}$.

At each side of the automobile, two foot board brackets, F, (Fig. 11) are secured to the outer face of the adjacent frame side member A. Each such bracket extends downward and obliquely outward and has at its lower end a horizontal arm, $F^1$, upon which the usual foot board, $F^2$, is supported. To the lower face of each such arm, $F^1$, is applied a cable bracket, G. Bolts, $F^3$, extend downward through the foot board and the arm, $F^1$, and apertures, $G^1$, (Fig. 13) in the bracket, G, whereby said bracket is bound firmly against the arm, $F^1$. The bracket, G, has at its upper face a shoulder, $G^2$, bearing against the outer end of the arm, $F^1$, of the bracket, F. The outer end of each bracket, G, is slanted downward and terminates in a sleeve, $G^3$, which receives a cable as will be described further on.

On the lower face of the bracket, G, is an eye, $G^4$, which receives one end of a cross rod, $G^5$, the other end of which extends through the eye, $G^4$, of the companion bracket, G, at the opposite side of the automobile. At each side of each eye, $G^4$, a nut, $G^6$, is threaded around said rod. When said rods are used, they impart additional stability to the brackets, F.

At the rear of the automobile are two supporting arms, H and $H^1$, which correspond to the arms, B and $B^1$. These arms are secured in a manner similar to the manner of securing the arms, B and $B^1$; but there are specific differences due to the difference in form of the parts of the automobile to which the arms, H and $H^1$, are attached.

Referring now to Figs. 14 to 22, inclusive, $A^4$ is the rear cross member of the automobile frame. This member is curved upward between its ends and it is channel-form in cross section and has its flanges, $A^5$, directed downward. Said cross member rests saddle-like upon the rear spring, S.

At their rear ends each side member, A, has its web cut away from its flanges and turned outward to form an ear, $A^7$, (Figs. 21 and 22) thus leaving the flanges, $A^1$, projecting in the form of horizontal tongues, $A^6$. The upright dimension of the cross member, $A^4$, equals the space between the flanges, $A^1$. Hence said cross member fits into the space between said tongues, $A^6$. The upper tongue, $A^6$, is riveted to the web of the cross member, $A^4$. A U-form bridge piece, $A^8$, is placed between the flanges, $A^5$, of the member, $A^4$, and seated on and riveted to the lower tongue, $A^6$, while the arms of the member, $A^8$, are riveted to the flanges, $A^5$, of the cross member, $A^4$, one rivet also extending through the ear, $A^7$.

The forward part of the arm, H, overlaps the outer face of the left hand side member, A, of the frame. On the right hand or inner face of the member, H, is a tongue, $H^2$, which extends across and rests upon the horizontal part of the U-form bridge piece, $A^8$, and between the flanges, of the bridge-piece, $A^8$. The forward end of the arm, H, terminates in a horizontal eye, $H^3$, which is positioned immediately above the level of the upper face of the side member, A. The upper arm of a U-bolt, $H^4$, extends through said eye and across the upper face of the member, A, while the other arm of the U-bolt extends below said side member. A binding plate, $H^5$, extends across the inner face of the side member, A, and is penetrated by the arms of the U-bolt. Nuts, $H^6$, are placed on the arms of the U-bolt and serve to draw the binding plate against the member, A. By this means the adjacent end of the arm, H, is bound to the member, A.

Immediately at the rear of the frame cross member, $A^4$, a stay rod, $H^7$, extends through the arm, H, and the arm, $H^1$. (See Fig. 17.) This part of each of said arms has a downward directed flange or ear, $H^9$, to receive this bolt. At each side of the flange a nut, $H^8$, is threaded to said rod. This rod co-operates with the U-bolts, $H^4$, to secure the arms to the side members, A. In addition to supporting the arms, the tongue, $H^2$, by fitting against the flanges of the bridge-pieces, $A^8$, serves to hold the arms against endwise movement.

Further engagement between each arm, H and $H^1$, and the adjacent side member, A, is made through a lateral extension, $H^{10}$, which bears against the lower face of the side member.

A metal cross bar, I, corresponding to the cross bar, E, at the front of the automobile, rests in transverse, horizontal bearings, $I^1$, formed near the rear ends of the arms, H and $H^1$. Set screws, $I^2$, extend into said bearings for engaging said cross bar. Said cross bar is preferably tubular, as shown in Fig. 18. Said bar may be shorter than the bar, E, because the rear wheels, W, do not turn sidewise for steering as is done with the front wheels. On the ends of the bar, I, are placed corner pieces, $I^3$, which are identical with the corner pieces, $E^3$, at the front of the automobile. On the rear end of each arm, H and $H^1$, and integral therewith, is an upright cross head, $I^4$, in the middle of which is a horizontal, transverse, aperture or eye, $I^5$, and in the upper end of which is an upright horizontal, aperture or eye, $I^6$, and in the lower end of which is a horizontal, upright aperture or eye, $I^7$.

A main steel wire fender cable, J, extends through the apertures, $I^5$, of the cross heads, $I^4$, and the corner pieces, $I^3$, the sleeves, $G^3$, the corner pieces, $E^3$, and the apertures, $E^{10}$. In the form shown in the drawings, this cable is a single piece with its ends meeting at the rear between the arms, H and $H^1$. There said ends are joined by a turn-buckle, $J^1$.

At the front end of the automobile an auxiliary steel cable, $J^2$, extends through the eyes, $E^{12}$, of the cross heads, $E^9$, and through the eyes, $E^8$, of the corner pieces, $E^3$, and through the eyes, $E^{11}$, of the cross heads, $E^9$, the ends of this cable meeting between said cross-heads below the main cable, J, and being there joined by a turn-buckle, $J^3$. At the rear end of the automobile an auxiliary cable, $J^4$, is similarly applied to the cross heads, $I^4$, and the corner pieces, $I^3$, said cable passing through the eyes, $I^7$, of the cross heads and through the eyes, $I^8$, in said corner pieces and through the eyes, $I^6$, of the cross heads. In the form shown in the drawings, the ends of this cable meet between the cross-heads, $I^4$, of the arms, H and H¹, and below the main cable, J, and are there joined by a turnbuckle, J⁵.

By means of the turn-buckle on the main cable, J, that cable may be given any desired tension; and by means of the turn-buckle on the auxiliary cables, those cables may be given any desired tension.

A main cable five eighths of an inch thick has been found sufficient. The auxiliary cables may be thinner.

The brackets, G, are preferably short enough to bring the cable, J, relatively close to, but spaced from, the foot board, F²; and the outer ends of said brackets are preferably extended downward obliquely so as to bring the main cable a little below the level of the foot board. The cross bar, I, is to be long enough to make the main cable clear the rear wheels, W. The front cross bar, E, is to be long enough to make the main cable clear, the front wheels, W, when they are turned for steering the automobile.

By reference to Fig. 3 of the drawings, it will be observed that the sleeves, G², of the brackets, G, are lower than the corner pieces, E³ and I³. By this means the main cable is made to form a part of a truss structure. Thus the automobile frame is trussed. Thus greater firmness is given to the automobile structure. This is particularly applicable to the foot boards, such trussing giving them a firmness which is lacking before this fender structure is applied. Thus my fender structure serves as a fender and also as a trussing structure imparting greater firmness to the automobile structure.

The front cross bar, E, the forward parts of the arms, B and B¹, and the part of the main cable in front of said cross bar also form a truss structure whereby the stability of said cross bar is increased. A similar truss structure is formed at the rear end of the car by the cross bar, I, the rear ends of the arms, H and H¹, and the part of the main cable which is at the rear of said cross bar.

At the front of the car, the auxiliary cable, J², and the cross heads, E⁰, and the cross bar, E, form a truss structure whereby greater strength is given to the forward part of the fender structure. A similar truss structure is formed at the rear end of the car by the rear auxiliary cable, J², the rear cross heads, I⁴, and the rear cross bar, I, whereby greater strength is given to the rear part of the fender structure.

The main cable and the auxiliary cables possess flexibility. When there is contact between the main cable and another automobile or any other body, the main cable yields to a limited degree due to the flexibility of the cable and the structures which support the cable, whereby shock is absorbed or reduced. If engagement between the main cable and the other automobile or other body is diagonal to the part of the cable which is engaged, such body will tend to slide or slip along the course of the cable until the direction of said body has been changed or its force reduced or overcome. Thus the main cable constitutes a deflecting member extending entirely around the automobile in such position and relationship as to avoid inter-locking of the wheels and other usually-exposed parts of the automobile when there is collision with another automobile or any other body. Avoiding such inter-locking is an important step in avoiding damage to the colliding bodies and is important relative to the reduction of force and the relative change of course of the colliding bodies.

What has just been said concerning the action of the main cable is applicable also to the auxiliary cables, excepting that they do not reach entirely around the automobile. They extend above and below the main cable at the front and at the rear of the automobile and extend the range of contact with a large contacting part of a colliding body, and they also are adapted to engage a colliding member which is lower or higher than the main cable.

It is to be remembered that the cable is a tension member which may be varied; but it must be recognized that the yielding due to flexibility and the adaptability to allow sliding of a colliding body along the tension member are important.

Relative to avoiding inter-locking during collision, it is to be noted that all the tension member supporting structures extend horizontally away from the automobile whereby the cables are spaced from the automobile in such manner as to make the tension members serve to keep the colliding body from engaging the supporting structures.

Relative to specific features, it is again to be observed that the arms, B, B¹ and H, H¹ and the brackets, G, are formed to adapt them for attachment to the well-known Ford automobile, such attachment being made without cutting or drilling any part of the automobile.

I claim as my invention,

1. The combination with the frame of an automobile, of supporting members extending outward at the ends and sides of the automobile, a main tension member extending around and spaced from the automobile and supported by said supporting members, and a secondary tension member supported by the end supporting members, substantially as described.

2. The combination with the frame of an automobile, of supporting members extending outward at the ends and sides of the automobile and having flexibility, a main tension member extending around and spaced from the automobile and supported by said supporting members, and a secondary tension member supported by the end supporting members, substantially as described.

3. The combination with the frame of an automobile, of supporting members extending outward at the ends and sides of the automobile, a main cable extending around and spaced from the automobile and supported by said supporting members, and a secondary tension member supported by the end supporting members, substantially as described.

4. The combination with the frame of an automobile, of supporting members extending outward at the ends and sides of the automobile and having flexibility, a main cable extending around and spaced from the automobile and supported by said supporting members, and a secondary tension member supported by the end supporting members, substantially as described.

5. The combination with the frame of an automobile, of supporting members extending outward at the ends and sides of the frame, a main tension member extending around the automobile and supported by said supporting members, adjustable means for joining the ends of said tension member, and a secondary tension member supported by the end supporting members, substantially as described.

6. In an automobile having foot boards, the combination with the frame of the automobile, of supporting members extending outward at the ends and sides of the frame, a tension member extending around the automobile and supported by said supporting members at approximately the height of and outward of the foot boards, and a secondary tension member supported by the end supporting members, substantially as described.

7. The combination with the frame of an automobile, of tension member supports at the sides of the frame, tension member supporting means extending horizontally across the front of the automobile and reaching farther laterally than the side tension member supports, a main tension member on said side supports and on said front supporting means, whereby space for the lateral moving of the steering wheels is left within the space enclosed by the tension member, and an auxiliary tension member supported by the front tension member supports, substantially as described.

8. The combination with the side members of an automobile frame, of supporting members extending outward from the ends and sides of the side members, a tension member extending around and spaced from the automobile and supported by said supporting members, and another tension member supported by the end supporting members, substantially as described.

9. The combination with an automobile having foot boards along its sides, of a relatively stationary fender structure extending around the automobile at approximately the height of and near the foot boards and including a main tension member and an auxiliary tension member and adapted to permit sliding on said tension structure when there is collision between said structure and an outside body, substantially as described.

10. The combination with an automobile having foot boards along its sides, of a yielding relatively stationary fender structure extending around the automobile at approximately the height of and near the foot boards and including a main tension member and an auxiliary tension member and adapted to permit sliding on said tension structure when there is collision between said structure and an outside body, substantially as described.

11. The combination with an automobile having foot boards along its sides, of a relatively stationary fender structure extending around the automobile at approximately the height of and near the foot boards and including a main cable and an auxiliary cable and adapted to permit sliding on said tension structure when there is collision between said structure and an outside body, means for adjusting the tension of the main cable, and means for adjusting the tension of the auxiliary cable, substantially as described.

12. The combination with an automobile having foot boards along its sides, of a yielding relatively stationary fender structure extending around the automobile at approximately the height of and near the foot boards and including a main cable and an auxiliary cable and adapted to permit sliding on said tension structure when there is collision between said structure and an outside body, means for adjusting the tension of the main cable, and means for adjusting the tension of the auxiliary cable, substantially as described.

13. The combination with the frame of an automobile, of a series of supporting members placed at the ends and sides of the automobile and having apertures, a main tension member extending around the automobile and through a part of said apertures, and auxiliary tension members supported in apertures of the end supporting members, substantially as described.

14. The combination with the frame of an automobile, of a series of supporting members placed at the ends and sides of the automobile and having apertures, a main tension member extending around the automobile and through a part of said apertures, auxiliary tension members supported in apertures of the end supporting members, and means on each of said tension members for giving tension to said members, substantially as described.

15. The combination with the frame of an automobile, of a supporting structure supported by and extending across and away from the end of the frame and comprising longitudinal arms and transverse arms, and a plurality of tension members extending across the end of the frame and spaced from the automobile and supported by said arms with their outer parts slanted toward the automobile, substantially as described.

16. The combination with the frame of an automobile, of a supporting structure extending across and away from the end of the frame and having a plurality of groups of engaging members spaced from the automobile and the members of each such group being out of alignment with each other, and a tension member applied to and supported by each such group of engaging members, substantially as described.

17. The combination with the frame of an automobile, of a supporting structure supported by and extending across and away from the end of the frame and a plurality of tension members also extending across the end of the frame and spaced from the automobile and supported by and in front of said supporting structure and approaching each other at the ends of their transverse parts in a manner forming trussing, substantially as described.

18. The combination with the frame of an automobile, of a supporting structure extending across and away from the end of the frame and having a plurality of groups of engaging members spaced from the automobile and such groups being out of alignment with each other, and a tension member applied to and supported by each group of engaging members in a manner forming trussing, substantially as described.

19. An attachment for an automobile, said attachment comprising a supporting structure adapted to be secured to the ends of the side members of the automobile frame and to extend across and away from the end of said frame, and a plurality of tension members also extending across the end of the automobile and secured to and in front of said supporting structure spaced from the automobile and having the ends of their transverse parts slanted toward the automobile and toward each other in a manner forming trussing, substantially as described.

20. The combination with the frame of an automobile, of a supporting structure supported by and extending across and away from and wider than the frame and having corner engaging members and intermediate engaging members, and a plurality of tension members supported by the corner engaging members and the intermediate engaging members and out of alignment between said corner members, whereby the supporting structure and said tension members form a truss structure, substantially as described.

21. The combination with the frame of an automobile, of a supporting structure supported by and extending across and away from each end of the frame and having engaging members, side supporting structures placed intermediate the frame ends and extending away from the frame and terminating at a lower level than the level of the engaging members of the end supporting structures, a main tension member supported by the engaging members of said end structures and by said side supporting members, whereby the frame and the end structures and the side structures and the tension member together form a truss structure, and an auxiliary tension member supported on one of the end supporting structures, substantially as described.

22. The combination with the frame of an automobile, of supporting means extending outward at the ends and sides of the automobile, the supporting means at the sides being lower than those at the ends, a main tension member extending around and spaced from the automobile and supported by said supporting means whereby the tension member and the supporting means form a fender and said tension member and said supporting means and the automobile frame form a truss structure, and an auxiliary tension member supported by the end supporting means at one end of the automobile structure, substantially as described 23. The combination with the frame of an automobile, of apertured supporting means extending outward at the ends and sides of the automobile, the supporting means at the sides being lower than the supporting means at the ends, a main tension member extending through the apertures of said supporting means and around and spaced from the automobile, whereby said tension member and said supporting means form a fender and the tension member and the supporting means and frame together form a truss structure, and an auxiliary tension member supported by the end supporting means at one end of the automobile, substantially as described.

24. The combination with the frame of an automobile, of a supporting structure extending across and away from the end of the frame and having arms extending to and secured to the frame and having corner supporting members and having intermediate said members other supporting members adapted to support tension members spaced from each other and out of alignment with said corner members, and tension members supported by said corner members and said intermediate members, substantially as described.

25. The combination with the frame of an automobile, of two supporting arms extending horizontally away from the end of the frame and having their outer ends formed for engagement by a tension member and said supporting arms being apertured transversely near their outer ends, a cross bar extending horizontally through said apertures, means for securing said bar in said arms, tension member engaging means on the ends of said cross bar, and a tension member supported by the engaging means on the cross bar and on said supporting arms, substantially as described.

26. The combination with the frame of an automobile, of two supporting arms extending horizontally away from the end of the frame and having their outer ends formed for engagement by a tension member and said supporting arms being apertured transversely near their outer ends, a cross bar extending horizontally through said apertures, means for securing said bar in said arms, tension member engaging means on the ends of said cross bar, and a wire cable supported by the engaging means on the cross bar and on said supporting arms, substantially as described.

27. The combination with the frame of an automobile, of two supporting arms extending horizontally away from the end of the frame and having their outer ends formed for engagement by a tension member and said supporting arms being apertured transversely near their outer ends, a cross bar extending horizontally through said apertures, means securing said bar in said arms, tension member engaging means on the ends of said cross bar, and a plurality of tension members supported by the engaging means on the cross bar and on said supporting arms, substantially as described.

28. The combination with the frame of an automobile, of two supporting arms extending horizontally away from the end of the frame and having their outer ends formed for engagement by a tension member and said supporting arms being apertured transversely near their outer ends, a cross bar extending horizontally through said apertures, means securing said bar in said arms, tension member engaging means on the ends of said cross bar, and a plurality of wire cables supported by the engaging means on the cross bar and on said supporting arms, substantially as described.

29. The combination with the frame of an automobile, of two supporting arms extending horizontally away from the end of the frame and having their outer ends formed for engagement by a tension member and said supporting arms being apertured transversely near their outer ends, a cross bar extending horizontally to said apertures, means securing said bar in said arms, tension member engaging means on the ends of said cross bar, a plurality of tension members supported by the engaging means on the cross bar and on said supporting arms, and means for adjusting the tension of said cables, substantially as described.

30. The combination with the frame of an automobile, of two suporting arms extending horizontally away from the end of the frame and having their outer ends formed for engagement by a tension member and said supporting arms being apertured transversely near their outer ends, a cross bar extending horizontally through said apertures, means securing said bar in said arms, tension member engaging means on the ends of said cross bar, a plurality of wire cables supported by the engaging means on the cross bar and on said supporting arms, and means for adjusting the tension of said cables, substantially as described.

31. The combination with the frame of an automobile, of a supporting structure supported by and extending across and away from the front end of the frame and having corner tension member engaging members and having intermediate said corner members apertured upright cross heads, and a tension member doubled upon said structure and applied to said corner members and at two points on each of said cross heads, substantially as described.

32. The combination with the frame of an automobile, of a supporting structure supported by and extending across and away from the front end of the frame and having corner tension member engaging members and having intermediate said corner members apertured upright cross heads, a tension member doubled upon said structure and applied to said corner members and at two points on each of said cross heads, and means for adjusting the tension of said tension member, substantially as described.

33. The combination with the frame of an automobile, of a supporting structure supported by and extending across and away from the front end of the frame and having corner tension member engaging members and having intermediate said corner members apertured upright cross heads, a tension member doubled upon said structure and applied to said corner members and at two points on each of said cross heads, a tension member supporting structure at the other end of the frame, supporting members at the sides of the frame, and a tension member extending around the automobile and engaged by said other end structure and said side supports and said corner members and cross heads, substantially as described.

34. The combination with the frame of an automobile, of a supporting structure supported by and extending across and away from the front end of the frame and having corner tension member engaging members and having intermediate said corner members apertured upright cross heads, a tension member doubled upon said structure and applied to said corner members and at two points on each of said cross heads, a tension member supporting structure at the other end of the frame, supporting members at the sides of the frame, a tension member extending around the automobile and engaged by said other end structure and said side supports and said corner members and cross heads, and means applied to each of said tension members for adjusting the tension of said members, substantially as described.

35. The combination with an automobile frame including two side members and two transverse end members, of a tension member supporting structure extending across one end of said frame and having two arms each over-lapping the outer upright face of the adjacent frame side member and bearing against the cross member, and means at each of said side members clamping the end of said arm to said side member, binding means engaging said arms between their ends for binding said arms to said side members and said cross member, and a tension member extending horizontally across and supported by said supporting member spaced from the automobile, substantially as described.

36. The combination with an automobile frame including two side members and two transverse end members, of a tension member supporting structure extending across one end of said frame and having two arms over-lapping the outer upright face of the adjacent frame side member and bearing against the cross member, and means at each of said side members clamping the end of said arm to said side member, a horizontal binding rod engaging said arms between their ends for binding said arms to said side members, and a tension member extending horizontally across and supported by said supporting structure spaced from the automobile, substantially as described.

37. The combination with a frame comprising side members and transverse end members, of a bracket seated on the outer side face of each side member, a supporting structure extending horizontally across and away from the end of the frame and having arms at each side of the frame and resting upon said bracket and bearing against the outer side face of the adjacent side member, means for binding said arms to said side members, and a tension member extending horizontally along the outer part of said supporting structure and supported by said structure, substantially as described.

38. The combination with a frame comprising side members and transverse end members, of a bracket seated on the outer side face of each side member, a supporting structure extending horizontally across and away from the end of the frame and having arms at each side of the frame and resting upon said bracket and bearing against the outer side face of the adjacent side member, individual means for clamping each of said arms to the adjacent frame member, common means binding said arms to said side members, and a tension member extending horizontally along the outer part of said supporting structure and supported by said structure, substantially as described.

39. The combination with a frame comprising side members and transverse end members, of a bracket seated on the outer side face of each side member, a supporting structure extending horizontally across and away from the end of the frame and having arms at each side of the frame and resting upon said bracket and bearing against the outer side face of the adjacent side member, a hook bolt and tie rod for binding said arms to said side members, and a tension member extending horizontally along the outer part of said supporting structure and supported by said structure, substantially as described.

40. The combination of an automobile frame comprising side members and end cross members, of a supporting structure extending horizontally across and away from one end of the frame and having two arms each of which over-laps the outer upright face of one of the side members and has a lateral extension bearing against a face of the cross member which face is parallel to the length of the frame and against a face of the cross member which is upright and transverse to the length of the frame, means for securing said arms to said side members, and a tension member extending horizontally along the outer part of said supporting member and supported thereby, substantially as described.

41. The combination with the frame of an automobile, of tension member supporting means supported on the ends and sides of said frame, a main tension member extending horizontally around said frame and supported on said supporting means spaced from the frame, and an auxiliary tension member folded upon itself and extending horizontally above and horizontally below the main tension member and supported by said supporting means at one end of the automobile, substantially as described.

42. The combination with the frame of an automobile, of tension member supporting means suported on the ends and sides of said frame, a main tension member extending horizontally around said frame and supported on said supporting means spaced from the frame, an auxiliary tension member folded upon itself and extending horizontally above and horizontally below the main tension member and supported by said supporting means at one end of the automobile, and means on each of said tension members for adjusting the tension of said member, substantially as described.

43. The combination with an automobile frame, comprising side members and end members, of a supporting structure extending horizontally across and away from one end of the frame and having two arms each of which over-laps the outer upright face of one of the side members, means for clamping said arms to the side members, and a tension member extending horizontally across the end of the frame and spaced therefrom and supported by the supporting structure, substantially as described.

44. The combination with an automobile frame, comprising side members and end members, of a supporting structure extending horizontally across and away from one end of the frame and having two arms each of which over-laps the outer upright face of one of the side members, hook bolts clamping the side members and the ends of said arms to each other and a horizontal clamping rod engaging both said arms at the front of the frame for clamping the arms to the frame, said arms to the side members, and a tension member extending horizontally across the end of the frame and spaced therefrom and supported by the supporting structure, substantially as described.

45. The combination with the frame of an automobile, of a supporting structure supported by and extending across and away from the end of the frame and comprising two corner supporting members and two intermediate supporting members, and a plurality of tension members supported by said four supporting members, the tension members approaching each other between each corner member and the adjacent intermediate supporting member, substantially as described.

46. The combination with the frame of an automobile, of a supporting structure supported by and extending across and away from the end of the frame and comprising two corner supporting members and two intermediate supporting members separate from the corner members, and a plurality of tension members supported by said four supporting members, the tension members approaching the automobile between each corner member and the adjacent intermediate supporting member, substantially as described.

47. The combination with the frame of an automobile, of a supporting structure supported by and extending across and away from the end of the frame and comprising two corner supporting members and two intermediate supporting members, and a plurality of tension members supported by said four supporting members, the tension members approaching each other and the automobile between each corner member and the adjacent intermediate supporting member, substantially as described.

In testimony whereof I have signed my name, this 24th day of March, in the year one thousand nine hundred and twenty-three.

COWAN RODGERS.